US009367402B1

United States Patent
Yadav et al.

(10) Patent No.: US 9,367,402 B1
(45) Date of Patent: Jun. 14, 2016

(54) COEXISTENCE OF BLOCK BASED BACKUP (BBB) PRODUCTS

(71) Applicant: EMC Corporation, Hopkinton, MA (US)

(72) Inventors: Sunil Yadav, Bangalore (IN); Pradeep Anappa, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 14/292,309

(22) Filed: May 30, 2014

(51) Int. Cl.
*G06F 17/00* (2006.01)
*G06F 11/14* (2006.01)

(52) U.S. Cl.
CPC .................................. *G06F 11/1448* (2013.01)

(58) Field of Classification Search
None
See application file for complete search history.

(56) References Cited

U.S. PATENT DOCUMENTS

| | | | | |
|---|---|---|---|---|
| 7,873,601 B1 * | 1/2011 | Kushwah | ............ | G06F 11/1451 707/654 |
| 7,934,064 B1 * | 4/2011 | Per | ...................... | G06F 11/1451 707/641 |
| 8,200,638 B1 * | 6/2012 | Zheng | ................. | G06F 11/1464 707/679 |
| 8,650,162 B1 * | 2/2014 | Vaikar | ................. | G06F 11/1451 707/692 |
| 2004/0268068 A1 * | 12/2004 | Curran | ................. | G06F 11/1451 711/162 |
| 2007/0083722 A1 * | 4/2007 | Per | ...................... | G06F 11/1451 711/162 |
| 2007/0112895 A1 * | 5/2007 | Ahrens | ............... | G06F 11/1435 |
| 2009/0006640 A1 * | 1/2009 | Brouwer | ................. | G06F 11/10 709/231 |
| 2012/0016841 A1 * | 1/2012 | Karonde | ............. | G06F 11/1448 707/641 |
| 2012/0179655 A1 * | 7/2012 | Beatty | ................. | G06F 11/1451 707/646 |
| 2013/0325810 A1 * | 12/2013 | Elder | ................ | G06F 17/30309 707/645 |

* cited by examiner

*Primary Examiner* — Hung Le
(74) *Attorney, Agent, or Firm* — Blakely, Sokoloff, Taylor & Zafman LLP

(57) ABSTRACT

A method and system for write tracking for block based backup that supports multiple block based backup applications. The method includes creating a first bitmap for a first block based backup application by the block based backup engine, creating a second bitmap for a second block based backup application by the block based backup engine. In response to receiving a request from a block based backup application to start a backup a check is made whether the request indicates a full backup or incremental backup for the first block based backup application. A merging of the bitmaps for block based backup applications is performed such that the performance of the requested backup is taken into account for the first backup application without adversely affecting the tracking of the block based backup of other backup applications.

14 Claims, 2 Drawing Sheets

COEXISTENCE OF BLOCK BASED BACKUP (BBB) PRODUCTS

FIELD OF INVENTION

Embodiments of the present invention relate generally to data backup and recovery. More particularly, embodiments of the invention relate to storing data in a backup system where there are multiple block based backup (BBB) applications.

BACKGROUND

In modern computer systems, a file system stores and organizes computer files to enable a program to efficiently locate and access requested files. File systems can utilize a storage device such as a hard disk drive to provide local access to data or to utilize a network to provide access to data stored on a remote file server over the network. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Blocked Based Backup (BBB) is a backup method where data is backed up as blocks. A block is a discrete set of bytes in a volume, where a volume is a logical data set stored in a data storage device or set of data storage devices. Traditional backup products use file based backup method where data is backed up as files. File based backup requires traversal of the file system which is a slow and inefficient process.

BBB uses a write tracker (WT) driver which keeps track of all the changes to blocks that occur in a volume. A BBB engine creates a bitmap which represents an array of blocks for all the clusters of the volume, where a cluster is a group of blocks. The BBB engine sets a bit representing a block or cluster as either true (1) or false (0) when a cluster is being modified. Initially, when the BBB engine is loaded by a kernel of an operating system, all bits are set as false. Similarly, all bits are set as false when a full backup of a volume is performed indicating that none of the blocks or cluster have changed since the last full backup.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
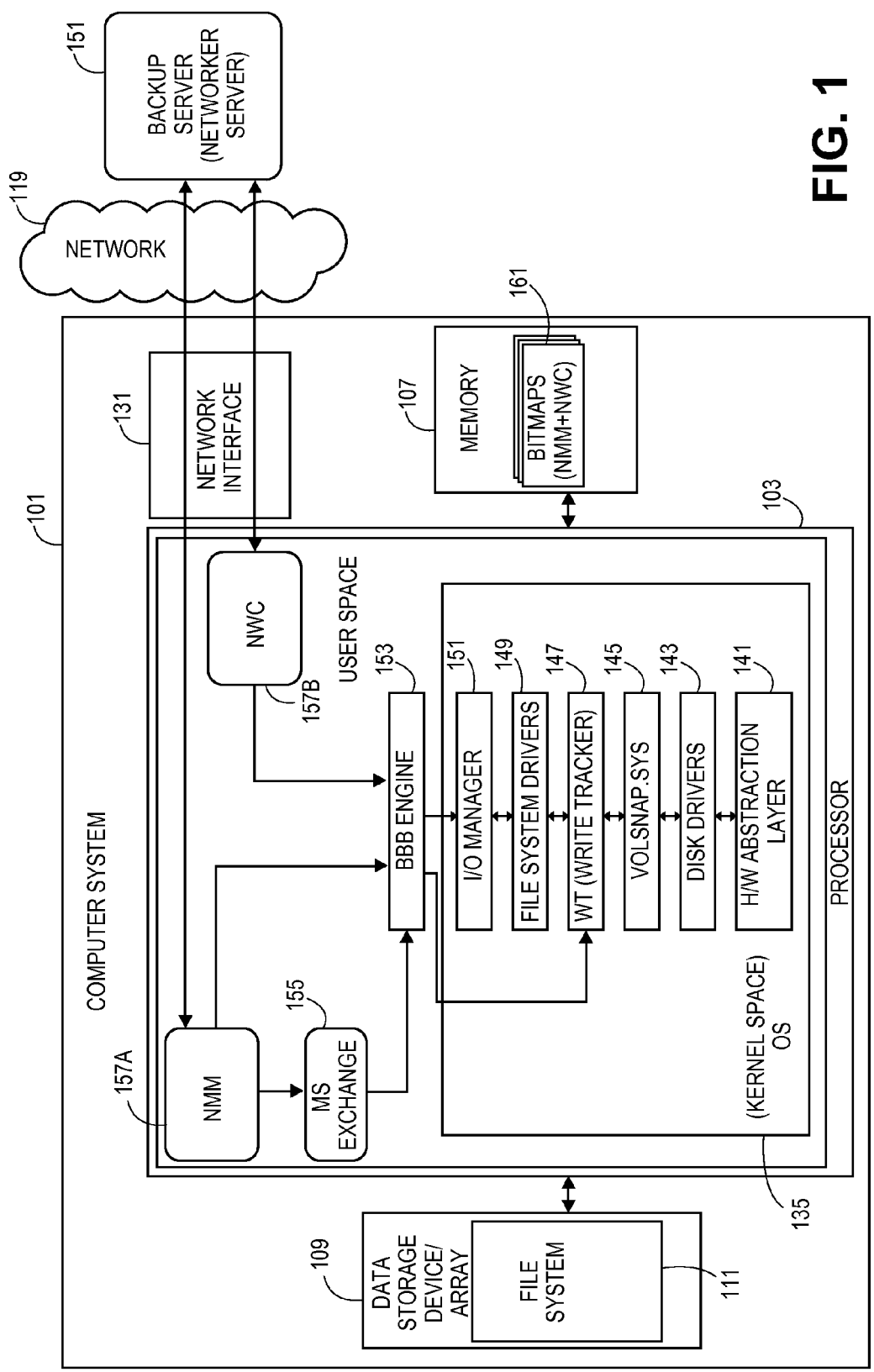
FIG. 1 is a block diagram of one embodiment of a backup data storage and recovery system implementing a multi-application block based backup.

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

As discussed herein above, data backup and data backup systems are designed to store a copy of a set of data storage systems in case of disaster recovery (DR) or similar scenarios. DR is a process of preparing for recovery or continued operation of technology infrastructure critical to an organization after a disaster that renders a computer inoperable or corrupts the data on the physical disk. One of the methods for performing data backup is the use of block based backup (BBB).

A BBB engine maintains a single bitmap for use by all of the BBB applications. In fact, the BBB engine operates without any information about the backup applications. It is the responsibility of a backup application to query the BBB engine and get the information about changed blocks or clusters and to backup these changed blocks or clusters up.

The backup applications can be responsible for backing up certain data sets or programs or groups or related programs. The backup applications can include a backup for a file system of a volume. An example of such a backup application is the NetWorker Windows Client (NWC) by EMC Corporation of Hopkinton, Mass. Another backup application can be focused on the backup of specific applications and their data. An example of such a backup application is the NetWorker Module (NMM) for Microsoft by EMC Corporation. While some implementations of NMM file based backup processes. NMM-BBB integration has also been implemented. Having multiple different backup applications however creates an issue of how BBB for the multiple backup applications can coexist, for example how BBB for file system backup via NWC and BBB for NMM will coexist. The embodiments encompass a solution which can be used across all the BBB applications for a system. Generally, all BBB applications (or at least those from a single company or source) rely on a single bitmap maintained by a write tracker. Without a unified solution, the BBB engine must track changes relative to each supported backup application. Maintaining multiple bitmaps by the BBB engine and write tracker can affect overall performance of the system as bitmaps are loaded by the kernel.

The BBB engine maintains a single bitmap for a volume. The BBB engine does not know how many BBB backup application are relying on it. The BBB engine keeps track of changes from the time it is initialized until it reinitialized. The BBB applications that need to support incremental backups have to query the BBB engine and get the bitmap, which they can utilize to backup the changed blocks or clusters identified by the bitmap.

To illustrate the problems with scenarios with multiple BBB applications, the following example with two BBB applications, an NWC which protects the file system and an NMM for protecting data from Microsoft Exchange is provided, Microsoft Exchange is a product of Microsoft Corporation, Redmond, Wash. In this scenario, the process would be started on system start with the initialization of the BBB engine. The NWC performs full backup of volume c:\ at time t1. The BBB engine is tracking the changes to volume c:\ from t1 going forward. A user adds or modifies some data or files in some folders on the c:\ volume after t1.

The NMM performs a full backup of Exchange, which is installed on the volume c:\ at c:\exchange\data. This full backup occurs at time t2. At this time NMM requests that the BBB driver resets the bitmap for volume c:\, because the NMM desires that BBB engine should track changes from the full backup onwards, i.e., from t2 going forward. After t2, the Exchange server adds some data in the data structures managed by Exchange in the folder of volume c:\ associated with the Exchange server.

At time t3, NWC seeks to perform an incremental backup of the file system of volume c:\, the NWC queries the BBB engine, and the BBB engine returns the current bitmap reflecting the changes since time t2, when it was last reset. However, this is not an accurate reflection of the block changes since the file system was last backed up. Specifically, the data added by the user between time t1 and time t2 is not tracked by the bitmap.

Similarly, if the NMM seeks to perform backup after NWC has performed this backup, the NMM will not have all the changes since the NMM performed the last backup. The process only works as intended if a single backup application performs the backup process. If more than one backup application is involved, then data-loss situations such as the one illustrated above will arise. This is not the ideal case. In a customer environment, multiple backup applications are likely to be utilized, though these backup applications can be from the same vendor. For example, a customer may be using the NWC for file system backup, the NMM for Exchange, SharePoint, SQL Server and similar applications. It is a fair expectation that such products should be able to coexist and should not interfere with each other's data performance.

The embodiments of the method and system described herein below overcome these limitations of the prior art while maintaining the speed and efficiency of using a single bitmap. The method and system enable running multiple BBB applications coherently and efficiently.

In backup systems, the backed up data is stored as a set of snapshots of the data storage system that are captured over time. This is in contrast to 'standard' backup processes that makes a duplicate and compresses it into another format on the backup system. Snapshot based backup can provide a backup with less downtime or disruption to the data storage system and that can provide a fast data recovery process. There are several types of storage snapshot systems including copy-on-write and split-mirror snapshot systems. The capacity to generate these snapshots is included in many data backup clients.

FIG. 1 is a block diagram of one embodiment of a backup data storage and recovery system implementing a multi-application block based backup. In one embodiment, a backup and recovery system 151 is in communication with a set of computing devices 101 over a network 119. A 'set,' a used herein refers to any positive whole number of items including one item. The backup and recovery system 151 can store a set of backup volumes that are block transfer replicas of physical volumes of the computing devices 101 at the time of the last full or incremental backup.

The backup and recovery system 151 can be a single server machine or can be a set of separate server machines. The backup and recovery system 151 can include a processor and a data store (not shown) amongst other standard components of a server machine. The data store can be any type of dynamic or static data storage system utilized by the processor and the backup system 151 to store working data, program data and similar data. The backup system 151 can also include network interfaces (not shown) for enabling communication over the network 119. The processor can be a single processor or a set of processors in a single housing or spread across a set of servers. These processors can execute backup software that interfaces with backup applications executed by the client computer systems 101. The backup applications drive the collection of the data to be backed up at defined intervals governed by configuration and policies of the backup applications.

The client systems 101 can be any type or number of computing devices including desktop devices, servers, mobile devices, or similar devices with fixed storage and network capabilities. The client systems 101 can be standalone devices or a set of devices linked in a local area network (LAN), a wide area network (WAN), a storage area network (SAN) or similar configuration. The client systems 101 can include a processor 103, memory 107 or similar data storage, storage array or device 109, network interface 131, and similar components. The processor 103 can be a set of processors to execute programs and applications within the client system 101 including local backup applications that can provide a configuration interface and/or manage the local collection of data for data backup operations.

The memory 107 or data store can be utilized for short term data storage for the programs and applications of the computing system 101. In one embodiment, the memory 107 can store the bitmaps 161 maintained by backup applications and/or the block based backup engine 151. These bitmaps 161 are data structures composed of an array of bits, where each bit represents a state of a block of data or similar unit of data in a volume of the computer system such as a volume on local data store 109. A separate bitmap 161 can be maintained for each volume or can be maintained for a set of volumes.

Similarly, the data storage array or device 109 can maintain a set of physical or logical volumes that include a set of file systems 111 maintained by an operating system 135 of the client system 101. The physical or logical volumes in the data storage array 109 can have any file system structure, content or organization. The block based backup process described herein is compatible with any file system 111 or content. The data storage array 109 can have any number or variety of physical devices with any amount of storage space. This storage space can be divided into any number of physical or logical volumes. Each of these physical or logical volumes can be backed up via the block based backup system by the backup applications. In the case of a failure or corruption, the physical or logical volumes can be replaced with the corresponding backup volumes to return the client system 101 to operation in a timely and predictable manner.

In one embodiment, the operating system 135 includes a set of functions for performing input/output (I/O) functions. The functions include a hardware abstraction layer 141 that provides an interface with the underlying hardware of the computer system 101 to other components of the operating system 135. The disk drivers 143 interface with the hardware abstraction layer 141 to drive the writes and reads of the data storage devices or arrays 109. Separate disk drivers 143 can be present for each of the data storage devices 109. In some embodiments, a volume shadow copy driver 145 (volsnap.sys) is present in the operating system and provides services for making copies of files or snapshots while in use. A write tracker 147 monitors the writes to the file system being processed by the operating system and updates a bitmap that tracks all of the changes. This bitmap, referred to herein as the WT bitmap, can be cleared at the direction of the BBB engine.

File system drivers 149 service requests to modify files in the file system 111 and can update and maintain the file system structure and meta data. An I/O manager 151 services read and write requests for all I/O devices received from applications executed in the user space of the computer system 101, e.g., backup applications. The I/O manager 151 provides an interface for user space applications to access, via reads and writes, the files and data of the file system 111.

User space applications are those applications with limited or indirect access to the computer system resources 101 that are managed by the operating system 135. The user space applications can be any type or number of applications such as enterprise, personal, design, creative, or similar applications. For example, an application could be an Exchange Server 155 by Microsoft Corporation, which manages email for an enterprise. In one embodiment, the applications can include backup applications. In the illustrated example embodiment, the backup applications are an NMM 157A to backup the Exchange Server 155 and a NWC 157B to backup the file system 111. This configuration is provided by way of example and not limitation. Those skilled in the art would understand that the principles, processes and structures of the embodiments can be utilized with any set of backup applications that are block based backup applications and that the BBB applications can be utilized to back up any data of the computer system 101.

Backup applications 157A and 157B interface with the BBB engine 153 to obtain WT bitmap information to enable the backup applications to know what blocks they need to backup for an incremental backup. The backup applications 157A and 157B can also utilize the BBB engine to direct that the WT bitmap be resent when a full backup is made. The further operation of the BBB engine and its interactions with the WT 147 are discussed herein below with regard to FIG. 2 that enable the efficient operation of BBB with multiple backup applications.

Figure 2:
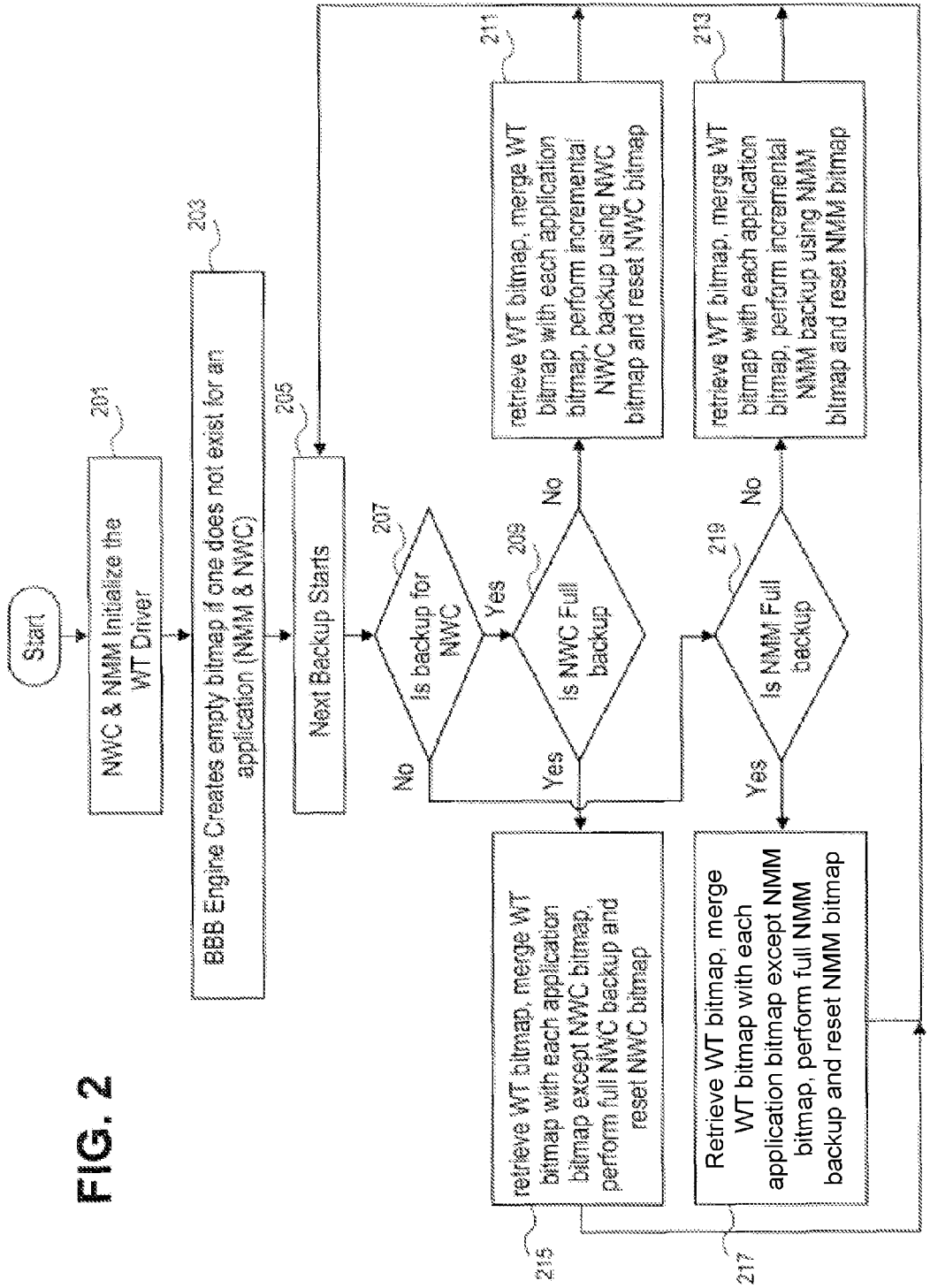
FIG. 2 is a flowchart of one embodiment of the process for block based backup supporting multiple block based backup applications.

FIG. 2 is a flowchart of one embodiment of the process for block based backup supporting multiple block based backup applications. In one embodiment the process begins with the initialization of the BBB engine and WT driver (also referred to herein simply as the Write Tracker (WT)) (Block 201). These components can be initialized by any block based backup application. In the examples described herein, the NWC and/or the NMM can initialize these components. The WT initializes and maintains a WT bitmap that tracks all changes to a given volume attached to the computer system and manages by the operating system. The WT can maintain a single bitmap for all volumes, can maintain separate bitmaps for each volume or can manage similar configurations. The BBB engine creates an empty bitmap (i.e. initializes a bitmap) for each backup application that is running (e.g., one bitmap for the blocks tracked by the NWC and one bitmap for the blocks tracked by the NMM) (Block 203). Additional bitmaps can be created as additional backup applications are brought online. As discussed herein above, an example of a case where there is a computer system having a file system backed up by NWC and an Exchange Server backed up by NMM is provided by way of illustration and for sake of clarity. However, one skilled in the art would understand that any number or type of block based backup applications could be utilized with this system.

With the bitmaps initialized and the WT maintaining all of these bitmaps as user applications and other programs make modifications to the relevant volume, a backup request can be received by the BBB engine from any of the backup applications (Block 205). The BBB engine analyzes the backup request to determine which application is making the request and to derive the proper backup state from each of the tracked bitmaps to be provided to the backup application.

In the example embodiment, a check is first made to determine if the backup request is from the NWC to backup the file system (Block 207). In other embodiments, any backup application can be the first checked and the order of checking whether the backup request originates with a backup application can vary. If the backup request is not from the NWC, then the process can check whether the request is from the NMM. However, if there are only two backup applications, as in the example embodiment, then the process does not need to further check where the request is received from. The process in either case proceeds to check the requested backup is a full backup or an incremental backup.

For example, if the request was determined to be from a NWC, then the check is made whether it is a full NWC backup (Block 209). If the request is a full backup, then the WT bitmap is retrieved and merged with each backup application bitmap except the requesting backup application bitmap (e.g., the NMM bitmap but not the NWC bitmap) (Block 215). The 'merger' of two or more bitmaps can be a logical OR of the bitmaps with the bit locations aligned. Since the request is a full backup, the requesting backup application is now up to date in having a copy of all relevant blocks, however the other backup applications still need tracking and thus merging their bitmaps with the WT preserves their state. In addition, the full NWC backup is performed and the NWC bitmap is reset. The process then continues on to await the next backup request (Block 205).

If the request was for an incremental NWC backup, then the WT bitmap is retrieved and merged with each application bitmap including the requesting backup application bitmap (e.g., the NMM bitmap and the NWC bitmap) (Block 211). Since the request is an incremental backup, the requesting backup application still needs to have a copy of changes to all relevant blocks, similarly the other backup applications still need tracking and thus merging their bitmaps with the WT preserves their state. In addition, the incremental NWC backup is performed and the NWC bitmap is reset. The process then continues on to await the next backup request (Block 205).

If the request was determined to be from a second backup application, in this example the NMM, then the check is made whether it is a full NMM backup (Block 219). If the request is a full backup, then the WT bitmap is retrieved and merged with each application bitmap except the requesting backup application bitmap (e.g., the NWC bitmap but not the NMM bitmap) (Block 217). Since the request is a full backup, the requesting backup application is now up to date in having a copy of all relevant blocks, however the other backup applications still need tracking and thus merging their bitmaps with the WT preserves their state. In addition, the full NMM backup is performed and the NMM bitmap is reset. The process then continues on to await the next backup request (Block 205).

If the request was for an incremental NMM backup, then the WT bitmap is retrieved and merged with each application bitmap including the requesting backup application bitmap (e.g., the NMM bitmap and the NWC bitmap) (Block 213). Since the request is an incremental backup, the requesting backup application still needs to have a copy of changes to all relevant blocks, similarly the other backup applications still need tracking and thus merging their bitmaps with the WT preserves their state. In addition, the incremental NMM backup is performed and the NMM bitmap is reset. The process then continues on to await the next backup request (Block 205).

An example application of this logic follows:

Notations—

F—refers to a first backup application; for example NWC

N—refers to a second backup application; for example NMM

'full' stands for full backup and 'incr' stands for incremental backup

TABLE I

| Ffull | Fincr | Nfull | Nfull | Fincr | Nfull | Ffull ... |
|-------|-------|-------|-------|-------|-------|-----------|
| 1     | 2     | 3     | 4     | 5     | 6     | 7         |

The scenario of table I is further described below step by step:

(1) Create an empty bitmap for each backup application if they do not already exist.

(2) At stage 1 (i.e. above in Table I), create a blank bitmap for the first backup application, NWC, and name it as, for example, NWC_Bitmap, perform full backup. WT is tracking changes.

(3) At stage 2, get the bitmap from WT, merge WT bitmap to NWC_Bitmap, perform the backup, reset NWC_Bitmap.

(4) At stage 3, get bitmap from WT, merge WT bitmap with all existing backup applications bitmaps, for current example, merge it with NWC_Bitmap. Create an empty bitmap for the second application, NMM, as 'NMM_bitmap,' as it does not exist yet.

(5) At stage 4, get bitmap from WT, merge WT bitmap with all existing bitmaps like NWC_Bitmap, with exception of NMM_bitmap, as it is full backup. Reset NMM_bitmap.

(6) At stage 5, get bitmap from WT, merge WT bitmap to all existing bitmaps like NMM_bitmap, backup the NWC_bitmap and reset NWC_bitmap.

(7) This logic is applied continuously as long as each of the backup applications if executing.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A method for block based backup supporting multiple block based backup applications, the method comprising:

creating a first bitmap for a first block based backup application by a block based backup engine;

creating a second bitmap for a second block based backup application by the block based backup engine;

receiving a request from a block based backup application to start a backup;

checking whether the request indicates a backup for the first block based backup application;

checking whether the request is for a full backup or incremental backup for the first block based backup application;

retrieving a third bitmap maintained by the write tracker and the first bitmap maintained by the first block based backup application, in response to determining that the request indicates a backup for the first block based backup application;

in response to determining that the request is for a full backup of the first block based backup application, merging the third bitmap of the write tracker with each bitmap maintained by the block based backup engine for each block based application except the first bitmap of the first block based backup application, performing a full backup of the first block based backup application, and resetting the first bitmap, where the backup is a full backup; and in response to determining that the request is for an incremental backup of the first block based backup application, merging the third bitmap with each bitmap maintained by the block based backup engine for each block based application, performing an incremental backup of the first block based backup application, and resetting the first bitmap, where the backup is an incremental backup.

2. The method for block based backup of claim 1, further comprising:

in response to determining that the request is for a full backup of the second block based backup application, merging the third bitmap with each bitmap maintained by the block based backup engine for each block based application except the second bitmap of the second block based backup application, performing a full backup of the second block based backup application, and resetting the second bitmap, where the backup is a full backup; and in response to determining that the request is for an incremental backup of the second block based backup application, merging the third bitmap with each bitmap maintained by the block based backup engine for each block based application, performing an incremental backup of the second block based backup application, and resetting the second bitmap, where the backup is an incremental backup.

3. The method for block based backup of claim 1, where the first block based backup application is a networker windows client (NWC).

4. The method for block based backup of claim 1, where the second block based backup application is a networker module for Microsoft (NMM).

5. The method for block based backup of claim 1, further comprising:
checking whether the request for backup is for the first block based backup application or the second block based backup application.

6. The method for block based backup of claim 1, further comprising:
checking whether the second bitmap exists for the second block based backup application; and
creating the second bitmap where it does not exist.

7. The method for block based backup of claim 1, further comprising:
checking whether the second bitmap exists for the second block based backup application; and
creating the second bitmap where it does not exist.

8. A non-transitory computer-readable memory having stored therein a set of instructions for a method block based backup supporting multiple block based backup applications, the set of instructions when executed by a computer processor to perform a set of actions comprising:
creating a first bitmap for a first block based backup application by a block based backup engine;
creating a second bitmap for a second block based backup application by the block based backup engine;
receiving a request from a block based backup application to start a backup; checking whether the request indicates a full backup for a first block based backup application;
checking whether the request is for a backup or incremental backup for the first block based backup application;
retrieving a third bitmap maintained by the write tracker and the first bitmap maintained by the first block based backup application, in response to determining that the request indicates a backup for the first block based backup application;
in response to determining that the request is for a full backup of the first block based backup application, merging the third bitmap of a write tracker with each bitmap maintained by the block based backup engine for each block based application except the first bitmap of the first block based backup application, performing a full backup of the first block based backup application, and resetting the first bitmap, where the backup is a full backup; and in response to determining that the request is for an incremental backup of the first block based backup application, merging the third bitmap with each bitmap maintained by the block based backup engine for each block based application, performing an incremental backup of the first block based backup application, and resetting the first bitmap, where the backup is an incremental backup.

9. The non-transitory computer-readable medium of claim 8, having instructions stored thereon for block based backup of claim 1, further comprising:
in response to determining that the request is for a full backup of the second block based backup application, merging the third bitmap with each bitmap maintained by the block based backup engine for each block based application except the second bitmap of the second block based backup application, performing a full backup of the second block based backup application, and resetting the second bitmap, where the backup is a full backup; and
in response to determining that the request is for an incremental backup of the second block based backup application, merging the third bitmap with each bitmap maintained by the block based backup engine for each block based application, performing an incremental backup of the second block based backup application, and resetting the second bitmap, where the backup is an incremental backup.

10. The non-transitory computer-readable medium of claim 8 having instructions stored thereon for block based backup of claim 1, where the first block based backup application is a networker windows client (NWC).

11. The non-transitory computer-readable medium of claim 8 having instructions stored thereon for block based backup of claim 1, where the second block based backup application is a networker module for Microsoft (NMM).

12. The non-transitory computer-readable medium of claim 8 having instructions stored thereon for block based backup, further comprising:
checking whether the request for backup is for the first block based backup application or the second block based backup application.

13. The non-transitory computer-readable medium of claim 8 having instructions stored thereon for block based backup, further comprising:
checking whether the first bitmap exists for the first block based backup application; and
creating the second bitmap where it does not exist.

14. The non-transitory computer-readable medium of claim 8 having instructions stored thereon for block based backup, further comprising:
checking whether the second bitmap exists for the second application; and creating the second bitmap where it does not exist.

* * * * *